US010859546B2

(12) United States Patent
Andersen et al.

(10) Patent No.: US 10,859,546 B2
(45) Date of Patent: Dec. 8, 2020

(54) PRINTABLE TIME-TEMPERATURE INDICATOR SYSTEM

(71) Applicant: KEEP-IT TECHNOLOGIES AS, Oslo (NO)

(72) Inventors: Peder Oscar Andersen, Oslo (NO); Eggert Freyr Gudjonsson, Oslo (NO); Åsmund K. Røhr, Ski (NO); Christian Salbu Aasland, Oslo (NO); Karina Kovalchuk, Oslo (NO); David Brown, Oslo (NO)

(73) Assignee: Keep-It Technologies AS, Oslo (NO)

( * ) Notice: Subject to any disclaimer, the term of this patent is extended or adjusted under 35 U.S.C. 154(b) by 189 days.

(21) Appl. No.: 16/063,205

(22) PCT Filed: Dec. 16, 2016

(86) PCT No.: PCT/EP2016/081579
§ 371 (c)(1),
(2) Date: Jun. 15, 2018

(87) PCT Pub. No.: WO2017/103206
PCT Pub. Date: Jun. 22, 2017

(65) Prior Publication Data
US 2018/0372700 A1 Dec. 27, 2018

(30) Foreign Application Priority Data

Dec. 17, 2015 (NO) .................................... 20151745

(51) Int. Cl.
*G01N 31/22* (2006.01)
*G01K 1/02* (2006.01)
*G01K 3/04* (2006.01)

(52) U.S. Cl.
CPC ............ *G01N 31/229* (2013.01); *G01K 1/02* (2013.01); *G01K 3/04* (2013.01)

(58) Field of Classification Search
CPC ...... G01N 31/229; G01N 31/22; G01N 31/00; G01K 1/02; G01K 1/00; G01K 3/04; G01K 3/02; G01K 3/00
(Continued)

(56) References Cited

U.S. PATENT DOCUMENTS

| 4,195,056 A | 3/1980 | Patel |
| 5,045,283 A | 9/1991 | Patel |

(Continued)

FOREIGN PATENT DOCUMENTS

| JP | 55-500 | 1/1980 |
| JP | 2006-519371 | 8/2006 |

(Continued)

OTHER PUBLICATIONS

International Preliminary Report on Patentability received for PCT Patent Application No. PCT/EP2016/081579, dated Nov. 22, 2017, 7 pages.
(Continued)

*Primary Examiner* — Christine T Mui
(74) *Attorney, Agent, or Firm* — Panitch Schwarze Belisario & Nadel LLP

(57) ABSTRACT

The present invention relates to a time-temperature indicator (TTI) system suitable for monitoring the time and temperature to which storage sensitive products have been exposed. The TTI system is inexpensive to produce, the response to time and temperature is given in a visually and easily interpretable manner and the visual design is easily adaptable.

29 Claims, 7 Drawing Sheets

(58) Field of Classification Search
USPC .................................................. 436/7; 422/50
See application file for complete search history.

(56) References Cited

U.S. PATENT DOCUMENTS

| | | | |
|---|---|---|---|
| 5,756,356 A | 5/1998 | Yanagi et al. | |
| 6,113,857 A | 9/2000 | Manico et al. | |
| 6,544,925 B1 | 4/2003 | Prusik et al. | |
| 7,290,925 B1 * | 11/2007 | Skjervold | G01N 31/229 374/106 |
| 8,343,437 B2 * | 1/2013 | Patel | G01N 31/229 422/424 |
| 2006/0130734 A1 | 6/2006 | Koivukunnas et al. | |

FOREIGN PATENT DOCUMENTS

| | | |
|---|---|---|
| JP | 2008-509415 | 3/2008 |
| JP | 2014-512011 | 5/2014 |
| WO | 1992/05415 A1 | 4/1992 |
| WO | 2004/077001 A1 | 9/2004 |
| WO | 2006/015962 | 2/2006 |
| WO | 2006/048412 A1 | 5/2006 |
| WO | 2012/141593 A2 | 10/2012 |
| WO | 2012/141594 A1 | 10/2012 |
| WO | 2013/186782 A1 | 12/2013 |
| WO | 2017/103206 A1 | 6/2017 |

OTHER PUBLICATIONS

International Search Report and Written Opinion received for PCT Patent Application No. PCT/EP2016/081579, dated Apr. 13, 2017, 10 pages.
Lauffer, Max A., "Theory of Diffusion in Gels", Biophysical Journal, vol. 1, 1961, pp. 205-213.
Search Report received for Norwegian Patent Application No. 20151745, dated Jul. 8, 2016, 2 pages.
JP Office Action issued in corresponding JP Patent Application No. 2018-531491 dated Oct. 1, 2020 (with English translation).

* cited by examiner

Figure 1
| Time (hours) | 0 | 6 | 12 | 18 | 24 | 48 |
|---|---|---|---|---|---|---|
| 20C, area A1 | | | | | | |
| 4C, area A1 | | | | | | |
Figure 2
| Activation (0 hours) | A1 | A2 | A3 | A4 | A5 |
|---|---|---|---|---|---|
| 10% glycerin | | | | | |
| 30% glycerin | | | | | |
| 50% glycerin | | | | | |
| 70% glycerin | | | | | |
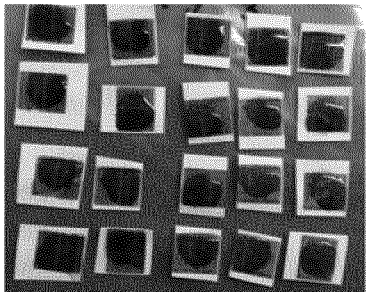
| After 6 hours | A1 | A2 | A3 | A4 | A5 |
|---|---|---|---|---|---|
| 10% glycerin | | | | | |
| 30% glycerin | | | | | |
| 50% glycerin | | | | | |
| 70% glycerin | | | | | |

| After 11 hours | A1 | A2 | A3 | A4 | A5 |
|---|---|---|---|---|---|
| 10% glycerin | | | | | |
| 30% glycerin | | | | | |
| 50% glycerin | | | | | |
| 70% glycerin | | | | | |

| After 17 hours | A1 | A2 | A3 | A4 | A5 |
|---|---|---|---|---|---|
| 10% glycerin | | | | | |
| 30% glycerin | | | | | |
| 50% glycerin | | | | | |
| 70% glycerin | | | | | |

Cross section aseptic short-life carton
(e.g. Fresh milk)

Cross section aseptic short-life carton
(e.g. Fresh milk)

Cross section aseptic short-life carton
(e.g. Fresh milk)

PRINTABLE TIME-TEMPERATURE INDICATOR SYSTEM

CROSS REFERENCE TO RELATED APPLICATIONS

This application is a U.S. National Phase patent application of PCT/EP2016/081579, filed Dec. 16, 2016, which claims priority to Norwegian Patent Application No. NO-20151745, filed Dec. 17, 2015, the disclosures of which are incorporated herein by reference in their entirety.

FIELD OF THE INVENTION

The present invention relates to a time-temperature indicator (TTI) system suitable for monitoring the time and temperature to which storage sensitive products have been exposed. The TTI system is inexpensive to produce, the response to time and temperature is given in a visually and easily interpretable manner and the visual design is easily adaptable.

BACKGROUND OF THE INVENTION

The quality of food products and other perishables are highly dependent on storage conditions such as the temperature and the storage time from production or packing until it finally reaches the end consumer. The deterioration processes are faster when the temperature is raised due to increasing biochemical, microbial or physical reaction rates, and therefore the quality of perishable goods declines more rapidly at high temperatures than at low temperatures.

Currently date marking is the standard method applied for the insurance of storage quality. By date marking only, no information is given to the consumer or others about the storage conditions to which the product has been exposed; hence the purchasers of susceptible products are not able to determine whether the product has been stored under appropriate temperature conditions during the time of storage. Relying on date marking as a sole quality criterion presupposes that the perishable product has been stored under appropriate conditions throughout the entire storage period. To be on the safe side, producers of perishable goods often use date marking with a wide safety margin, hence products which are actually still suitable for consumption or use are often discarded.

Therefore, there is a continuing interest in the monitoring of the time and temperature to which storage sensitive products have been exposed in e.g. food, pharmaceutical and chemical distribution chains from factory to consumer. By supplying a perishable product with a time-temperature indicator (TTI) which follows the individual product from packing to sale, the producer, the grosser, the retailer and the consumer will have a better product control than they currently have.

The reliability of a TTI system depends to a large extent on the correlation of the TTI response with that of reactions leading to quality loss. Unless the change in the rate with temperature of the TTI system closely parallels the temperature dependence of the rate of quality detoriation of the monitored product, the system will not be able to accurately predict the shelf life remaining for a variable temperature distribution. Also, as the temperature dependence on quality detoriation may be different in different temperature intervals, the temperature dependency of the TTI may in these cases advantageously be of a non-linear response.

Further, the response to time and temperature should be substantially irreversible to prevent the TTI from being reset. It is also preferred that the TTI is capable of indicating the time-temperature history within a wide temperature range. The indicator should also be conveniently activated so that pre-usage storage of the indicator is not a problem, and the response to time and temperature should be given in a visually and easily interpretable manner. Also, the indicator should be stable upon long storage times at the requested conditions prior to activation and use. Finally, and importantly, it should be non-toxic and not pose any threat to human health.

WO 2012/141594 (Keep-It Technologies AS) discloses a TTI system comprising two compartments initially being separated by suitable means for preventing contact between them. The system is activated by bringing said two compartments into contact and thereby allow for a mutarotational reducing agent to migrate in a time-temperature dependent manner from one of the compartments into the other which contain an agent which changes visual appearance upon reduction. The mutarotational reducing agent will then reduce the agent which changes visual appearance upon reduction in a time-temperature dependent manner. Thus, the time-temperature sensitivity of the system is the result of a combination of two time-temperature dependent processes.

Until now the main focus of the prior art has been on identifying processes which alone or in combination have a time-temperature sensitivity which closely reflects the time-temperature dependence of the rate of quality detoriation of the monitored product over a wide temperature range and how to design a TTI system based on one or more such processes that are visually and easily interpretable. Even though relatively good indicator systems have been provided, there is a need in the art for TTI systems that are less expensive to produce.

According to the present invention there is now provided a TTI system useful for monitoring the time and temperature exposure of food and other products. The TTI system is inexpensive to produce and the response to time and temperature is given in a visually and easily interpretable manner and may in principle take any form or shape.

SUMMARY OF THE INVENTION

The present invention provides in a first aspect a time-temperature indicator (TTI) system comprising a substrate to which at least a first agent and a second agent have been applied; the substrate having at least a first and a second section;
wherein
 the first agent and the second agent have been applied to at least the first and the second section of the substrate;
 the first agent and the second agent provides a visual change in appearance, such as a change in color, when brought in contact in the presence of a solvent; and
 the number of moles of the first agent that has been applied to the first section of the substrate is different from the number of moles of the first agent that has been applied to the second section of the substrate; or
 the number of moles of the second agent that has been applied to the first section of the substrate is different from the number of moles of the second agent that has been applied to the second section of the substrate.

The present invention provides in a second aspect a time-temperature indicator (TTI) system comprising a substrate to which at least a first agent, a second agent and at least one barrier component have been applied; the substrate having at least a first and a second section;
wherein
the first agent, the second agent and the at least one barrier component have been applied to at least the first and the second section of the substrate;
the first agent and the second agent initially being separated by the at least one barrier component in those sections of the substrate to which the first agent, the second agent and the at least one barrier component have been applied;
the first agent and the second agent provides a visual change in appearance, such as a change in color, when brought in contact in the presence of a solvent; and
the number of moles of the first agent that has been applied to the first section of the substrate is different from the number of moles of the first agent that has been applied to the second section of the substrate; or
the number of moles of the second agent that has been applied to the first section of the substrate is different from the number of moles of the second agent that has been applied to the second section of the substrate; or
the number of moles of one of the barrier components that has been applied to the first section of the substrate is different from the number of moles of the same barrier component that has been applied to the second section of the substrate.

It is to be understood that if 1 mole of a first barrier component and two moles of a second barrier component is applied to the first section of the substrate, and 1 mole of a first barrier component and four moles of a second barrier component is applied to the second section of the substrate; then the number of moles of one of the barrier components, i.e. the second barrier component, that has been applied to the first section of the substrate is different from the number of moles of the same barrier component, i.e. the second barrier component, that has been applied to the second section of the substrate.

In one embodiment according to the second aspect of the present invention, the one or more barrier component is independently selected from the group consisting of wax or mixture of waxes, oil or mixture of oils, fatty acid or a mixture of fatty acids, sugar or a mixture of sugars, sugar alcohol or a mixture of sugar alcohols, salt or a mixture of salts and any mixture thereof.

In another embodiment according to the second aspect of the present invention, the one or more barrier component is independently selected from the group consisting of wax, oil, fatty acid, sugar, sugar alcohol, salt and any mixture thereof.

According to certain embodiments of the second aspect of the present invention, the at least one barrier component is not dissolved in a dissolution medium during application; or the at least one barrier component is dissolved in a dissolution medium during application, the dissolution medium being removed by suitable means after application.

In another embodiment according to the second aspect of the present invention, the at least one barrier component is applied to the substrate by printing, e.g. by inkjet, offset, flexo, silkscreen, gravure, folio and/or spray printing; or coating.

According to certain embodiments of the second aspect of the present invention, the number of moles of one of the barrier components that has been applied to the first section of the substrate is at least 10% higher, such as 20% higher, 30% higher, 40% higher, 50% higher or 100% higher than the number of moles of the same barrier component that has been applied to the second section of the substrate.

In another embodiment according to the second aspect of the present invention, the first agent:one of the barrier components:the second agent molar ratio of the first section of the substrate is different from the first agent:one of the barrier components:the second agent molar ratio of the second section of the substrate.

In one embodiment according to the second aspect of the present invention the first agent:second agent molar ratio of the first section of the substrate is different from the first agent:second agent molar ratio of the second section of the substrate; and the number of moles of one of the barrier components that has been applied to the first section is identical to the number of moles of the same barrier component that has been applied to the second section of the substrate.

According to certain embodiments of the second aspect of the present invention, the the first agent:second agent molar ratio of the first section of the substrate is identical to the first agent:second agent molar ratio of the second section of the substrate; and the number of moles of one of the barrier components that has been applied to the first section of the substrate is different from the number of moles of the same barrier component that has been applied to the second section of the substrate.

According to certain embodiments, the present invention provides a time-temperature indicator (TTI) system, wherein the substrate is selected from the group consisting of paper, coated paper, plastics, cardboard, metal, silicon, ceramics, fabrics, textiles, glass or any combination thereof.

According to other embodiments, the present invention provides a time-temperature indicator (TTI) system, wherein
the first agent is a reducing agent, such as thiosulfate (e.g. sodium thiosulfate) or a reducing sugar; and the second agent is an agent which changes visual appearance upon reduction, such as a iodine-starch complex; or
the first agent is an oxidizing agent; and the second agent is an agent which changes visual appearance upon oxidation; or
the first agent is a salt; and the second agent is an agent which changes visual appearance when forming a complex with the salt; or
the first agent is a salt; and the second agent is an agent which changes visual appearance when forming a precipitate with the salt; or
the first agent is an acid, base or any mixture thereof; and the second agent is an agent which changes visual appearance upon a change in pH.

According to other embodiments, the present invention provides a time-temperature indicator (TTI) system, wherein the time-temperature indicator (TTI) system is being activated by applying a solvent to at least the first and the second section of the substrate. The solvent may e.g. be applied by means of printing, roller deposition, spraying, a mist chamber or a coating unit.

According to other embodiments, the present invention provides a time-temperature indicator (TTI) system, wherein the solvent is selected from the group consisting of water, glycerol or any combination thereof.

According to other embodiments, the present invention provides a time-temperature indicator (TTI) system, wherein the solvent comprises a pH modifying agent.

According to other embodiments, the present invention provides a time-temperature indicator (TTI) system, wherein the solvent comprises low molecular material, such as salts, alcohols, acids, bases or sugars or higher molecular materials such as polymers, i.e. polysaccharides, proteins or synthetic polymers.

According to other embodiments, the present invention provides a time temperature indicator (TTI) system, wherein the solvent exists in the form of a dispersion, such as an aerosol, a foam, an emulsion or a suspension. Further, the solvent may comprise gases, liquids or solids of both hydrophobic and hydrophilic materials.

According to other embodiments, the present invention provides a time-temperature indicator (TTI) system, wherein
the first agent and the second agent are not dissolved in a dissolution medium during application; or
the first agent and the second agent are dissolved in a dissolution medium during application, the dissolution medium being removed by suitable means after application; or
one of said first and second agent is dissolved in a dissolution medium during application, the dissolution medium being removed by suitable means after application; and the other agent is not dissolved in a dissolution medium during application.

According to other embodiments, the present invention provides a time-temperature indicator (TTI) system, wherein the first agent and the second agent are dissolved in a mixture of water and glycerol during application; with the proviso that the amount of water is less than 40% by weight of the mixture, such as less than 30% by weight of the mixture or less than 20% by weight of the mixture.

According to other embodiments, the present invention provides a time-temperature indicator (TTI) system, wherein
the number of moles of the first agent that has been applied to the first section of the substrate is at least 10% higher, such as 20% higher, 30% higher, 40% higher, 50% higher or 100% higher than the number of moles of the first agent that has been applied to the second section of the substrate; or
the number of moles of the second agent that has been applied to the first section of the substrate is at least 10% higher, such as 20% higher, 30% higher, 40% higher, 50% higher or 100% higher than the number of moles of the second agent that has been applied to the second section of the substrate.

According to other embodiments, the present invention provides a time-temperature indicator (TTI) system, wherein the first agent:second agent molar ratio of the first section of the substrate is different from the first agent:second agent molar ratio of the second section of the substrate.

According to other embodiments, the present invention provides a time-temperature indicator (TTI) system, wherein
the substrate is selected from the group consisting of paper, coated paper, plastics, cardboard, metal, silicon, ceramics, fabrics, textiles, glass or any combination thereof;
the first agent and the second agent are dissolved in a dissolution medium during application, the dissolution medium being removed by suitable means after application thereby providing a time-temperature indicator (TTI) system in inactive state; and
the time-temperature indicator (TTI) system is being activated by applying a solvent to at least the first and the second section of the substrate.

According to other embodiments, the present invention provides a time-temperature indicator (TTI) system, wherein
the substrate is selected from the group consisting of paper, coated paper, plastics, cardboard, metal, silicon, ceramics, fabrics, textiles, glass or any combination thereof;
the first agent and the second agent are dissolved in a dissolution medium during application, the dissolution medium being removed by suitable means after application thereby providing a time-temperature indicator (TTI) system in inactive state;
the first agent is a reducing agent, such as thiosulfate (e.g. sodium thiosulfate); and the second agent is an agent which changes visual appearance upon reduction, such as a iodine-starch complex; and
the time-temperature indicator (TTI) system is being activated by applying a solvent to at least the first and the second section of the substrate.

According to other embodiments, the present invention provides a time-temperature indicator (TTI) system, wherein
the substrate is selected from the group consisting of paper, coated paper, plastics, cardboard, metal, silicon, ceramics, fabrics, textiles, glass or any combination thereof;
the first agent and the second agent are dissolved in a dissolution medium during application, the dissolution medium being removed by suitable means after application thereby providing a time-temperature indicator (TTI) system in inactive state;
the first agent is a mutarotational reducing agent, such as fructose; the second agent is an agent which changes visual appearance upon reduction, such as a iodine-starch complex;
the time-temperature indicator (TTI) system is being activated by applying a solvent to at least the first and the second section of the substrate; and
the solvent comprises a pH modifying agent.

DESCRIPTION OF THE FIGURES

Preferred embodiments of the present invention will now be illustrated in more detail with reference to the accompanying figures.

FIG. 1 illustrates the temperature sensitivity of a TTI system according to the present invention (see example 1).

(FIG. 7b) respectively; and the effect of applying higher amounts of an agent which changes visual appearance upon reduction at room temperature (FIG. 7a) and at 12° C. (FIG. 7b) respectively (see example 5).

DETAILED DESCRIPTION OF THE INVENTION

Figures 2, 3:
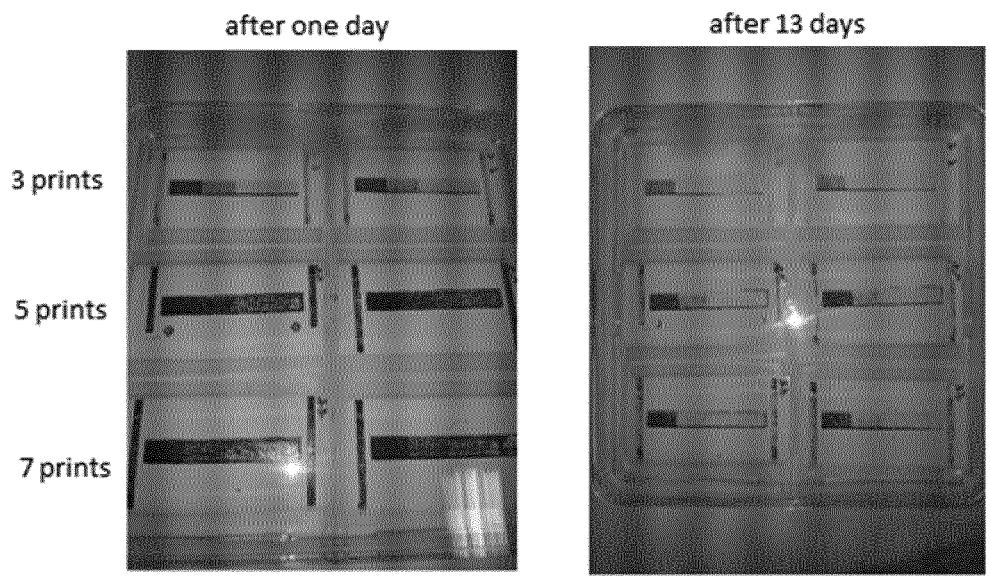
FIG. 2 illustrates the temperature sensitivity of a TTI system according to the present invention using different modes of activation (see example 2).
FIG. 3 illustrates the effects of the saturation of agent A (see example 3).

In those cases where the TTI system is to be supplied to expensive products or a unit load, i.e. combination of a number of products into single units suitable for transport which can be easily separated into single products at a distribution point, the production costs of the indicator system may be of less importance. However, if the TTI system is to be supplied to single products, in particular less expensive products such as consumer food packages like milk or juice cartons, it is of most importance that the indicator system is inexpensive to produce. It is also an advantage if the system is flexible with regard to design in order to meet the need from the consumers. Thus, there is a need in the art for TTI systems that are inexpensive to produce and from a commercial perspective; it is also an advantage if the visual design of the indicator system is easily adaptable.

A first aspect of the present invention relates to a time-temperature indicator (TTI) system comprising a substrate to which at least a first agent and a second agent have been applied; the substrate having at least a first and a second section; wherein
  the first agent and the second agent have been applied to at least the first and the second section of the substrate;
  the first agent and the second agent provides a visual change in appearance, such as a change in color, when brought in contact in the presence of a solvent; and
  the number of moles of the first agent that has been applied to the first section of the substrate is different from the number of moles of the first agent that has been applied to the second section of the substrate; or
  the number of moles of the second agent that has been applied to the first section of the substrate is different from the number of moles of the second agent that has been applied to the second section of the substrate.

A second aspect of the present invention relates to a time-temperature indicator (TTI) system comprising a substrate to which at least a first agent, a second agent and at least one barrier component have been applied; the substrate having at least a first and a second section;
  wherein
  the first agent, the second agent and the at least one barrier component have been applied to at least the first and the second section of the substrate;
  the first agent and the second agent initially being separated by the at least one barrier component in those sections of the substrate to which the first agent, the second agent and the at least one barrier component have been applied;
  the first agent and the second agent provides a visual change in appearance, such as a change in color, when brought in contact in the presence of a solvent; and
  the number of moles of the first agent that has been applied to the first section of the substrate is different from the number of moles of the first agent that has been applied to the second section of the substrate; or
  the number of moles of the second agent that has been applied to the first section of the substrate is different from the number of moles of the second agent that has been applied to the second section of the substrate; or
  the number of moles of one of the barrier components that has been applied to the first section of the substrate is different from the number of moles of the same barrier component that has been applied to the second section of the substrate.

In one embodiment according to the present invention the solvent is non-polar, polar or any mixture thereof. In case the solvent is a polar solvent, the solvent may be polar aprotic, polar protic or any mixture thereof. Preferably, the solvent is a polar solvent. Examples of suitable solvents is water, glycerol or any combination thereof.

Examples of non-polar solvents are hexane, Benzene, Toluene, Diethyl ether, Chloroform and 1,4-Dioxane. Examples of polar aprotic solvents are Ethyl acetate, Tetrahydrofuran, dichloromethane, acetone, acetonitrile, dimethylformamide and dimethyl sulfoxide. Examples of polar protic solvents are acetic acid, n-butanol, isopropanol, n-propanol, ethanol, methanol, formic acid, water and glycerol.

Barrier Component(s)

In one embodiment according to the present invention, the one or more barrier components are temperature sensitive. In one embodiment according to the present invention, the at least one barrier component is temperature sensitive. In one embodiment, the barrier component(s) together form a temperature sensitive barrier.

According to the second aspect of the present invention, the first agent and the second agent are initially being separated by the at least one barrier component thereby forming a sandwich-like structure. The purpose of the at least one barrier component is to regulate the rate at which said first and second agents are brought into contact.

Figure 6A:
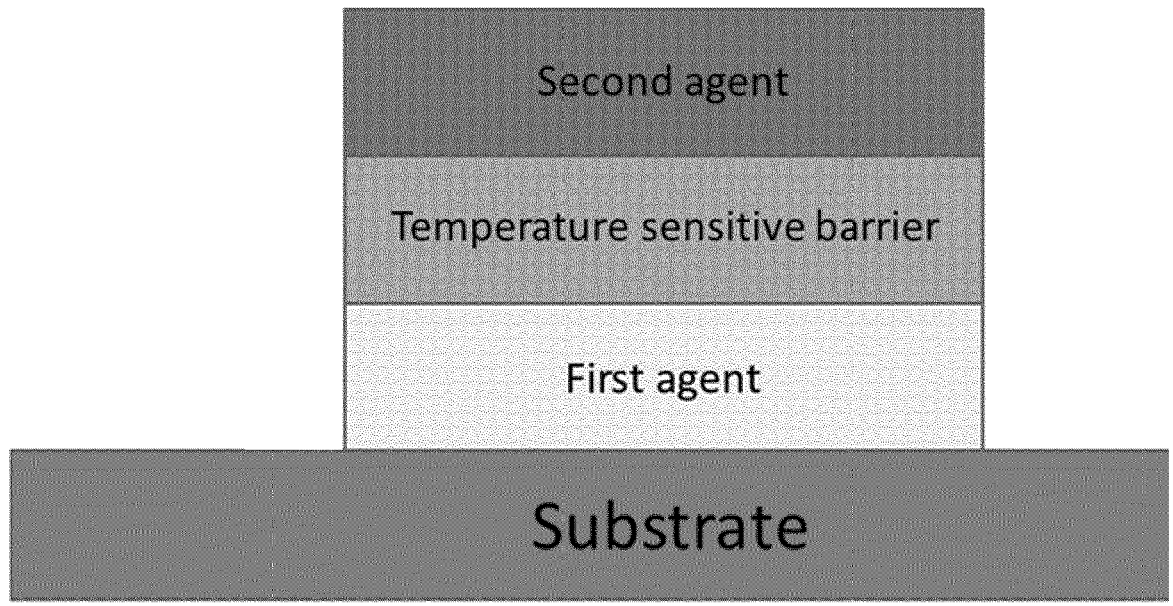
FIGS. 6a and 6b illustrate 2 representations of layer structures according to the present invention.
Figure 6B:
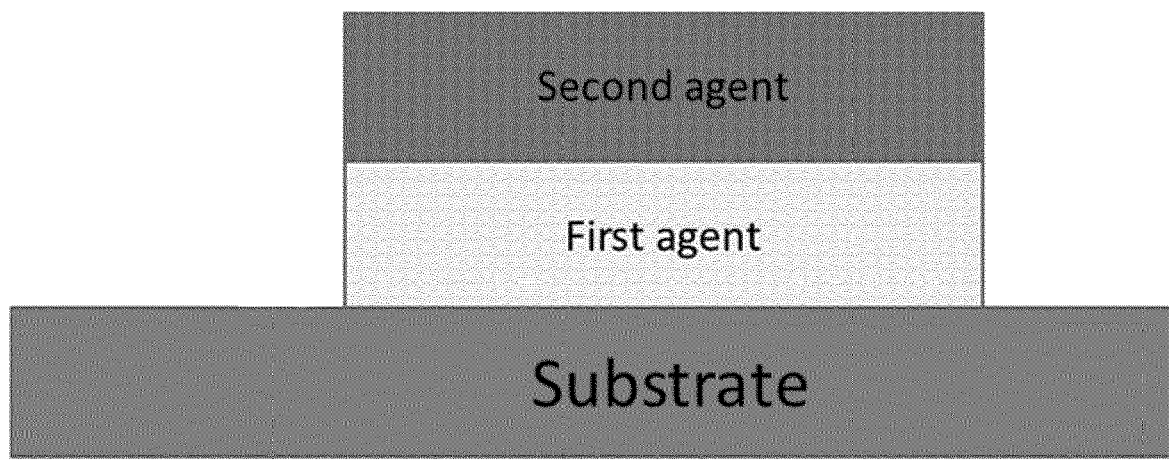

In one embodiment according to the second aspect of the present invention, the at least one barrier component is applied on top of the first agent and the second agent is applied on top of the at least one barrier component, thereby forming a sandwich-like structure with the at least one barrier component as an intermediate layer separating the first agent from the second agent (see FIG. 6a).

In another embodiment according to the second aspect of the present invention, the at least one barrier component is applied on top of the second agent and the first agent is applied on top of the at least one barrier component, thereby forming a sandwich-like structure with the at least one barrier component as an intermediate layer separating the first agent from the second agent.

The at least one barrier component is typically a compound which restrict diffusion, fully or partly, of said first and/or second agent within one temperature range and abruptly changes character and thereby allow for diffusion of said first and/or second agent within other temperature ranges. Examples of such compounds may be wax or mixture of waxes, oil or mixture of oils, fatty acid or mixture of fatty acids, or other compounds which melts at distinct temperatures, such that the at least one barrier component changes character at given temperatures.

In another embodiment according to the second aspect of the present invention the at least one barrier component is a compound which control diffusion of said first and second agent in a temperature sensitive manner, thus giving controlled and varying reaction times, e.g. with increasing temperatures. Examples of such compounds may be salt or sugar solutions of high concentration, i.e. fructose, glucose, sorbitol, sorbitol anhydride, trehalose, syrups, which may drastically change viscosity even with minor temperature changes which affect the diffusion rate of said first and second agent through the barrier layer. The concentration of the sugar solution may be in the range 0.1-100%, 10-100%, 20-100%, 40-100%, 50-100%, 60-100% 70-100% (by weight).

In one embodiment of the present invention the viscosity of the one or more barrier components in the first section of the substrate is different from the viscosity of the one or more barrier components in the second section of the substrate. The difference in viscosity between the two sections of the substrate may be above 5%; above 10%; above 20%; above 40%; above 50%, above 100% or may be in the range of 5%-300%; 10%-200%; 10%-100%; 20%-100% or 50-100%. The viscosity may be measured in units mPa*s using a rotational viscometer such as Sheen VM1 at 20 rpm. Viscosity may be measures at the temperature intervals in scope.

In one embodiment of the present invention the diffusion coefficient of the first agent in the one or more barrier components in the first section of the substrate is different from the diffusion coefficient of the first agent in the one or more barrier components in the second section of the substrate. In another embodiment, the diffusion coefficient of the second agent in the one or more barrier components in the first section of the substrate is different from the diffusion coefficient of the second agent in the one or more barrier components in the second section of the substrate. The difference in the diffusion coefficient of the first agent or the second agent in the two sections of the substrate may be above 5%; above 10%; above 20%; above 40%; above 50%, above 100% or may be in the range of 5%-300%; 10%-200%; 10%-100%; 20%-100% or 50-100%. The diffusion coefficient may be measured in unit $m^2/s$. The diffusion coefficient can be calculated in a number of ways e.g using Fick's laws of diffusion or modifications, see ie. Lauffer, Max A; *Biophys J.* 1961 January; 1(3): 205-213.

The at least one barrier component is preferably selected from the group consisting of wax or a mixture of waxes, oil or a mixture of oils, water in oil and oil in water emulsions, fatty acid or a mixture of fatty acids, solution of sugar or solution of sugars, solution of salt or solution of salts; and any mixture thereof.

In one embodiment of the present invention the melting point of the one or more barrier component in a first section of the substrate is different from the melting point of the one or more barrier component in a second section of the substrate. The difference in melting point of the one or more barrier component between said first and second section of the substrate may be above 2° C.; above 5° C.; above 10° C.; above 20° C.; above 40° C.; above 50° C., or above 100° C. or may be in the range of 2° C.-100° C.; 2° C.-50° C.; 5° C.-50° C.; or 10° C.-50° C. The melting points may be measured using differential scanning calorimetry (DSC) using gradual heating.

In another embodiment of the present invention there are two or more barrier components, wherein at least two of these components have different melting points.

If the at least one barrier components is a sugar, said sugar is preferably selected from the group consisting of monosaccharides, such as fructose, glucose, trehalose or sorbitol or any derivatives thereof; disaccharides, such as maltose or sucrose or any derivative thereof; oligosaccharides; and polysaccharides.

If the at least one barrier components is a wax, the wax may prevent or restrict contact between the first and second agent while contact will be re-established when the wax turn into a liquid.

In another embodiment according to the second aspect of the present invention, the at least one barrier components is a gelling agent which will ensure that the barrier exist in a gelled state within a given temperature range and in a non-gelled state within another temperature range.

In one embodiment according to the second aspect of the present invention, the first agent and the second agent may be included within the at least one barrier component, and thus be distributed, evenly or non-evenly throughout the barrier. In the context of the present invention it is to be understood that the first agent are considered separated from the second agent even if the first and second agent are distributed throughout the barrier.

The at least one barrier component may be applied in thicknesses from 0.1 to 1000 micron, more preferably 1-100 microns, such as e.g. 1-90 microns, 1-80 microns, 1-70 microns, 1-60 microns, 5-60 microns, 5-50 microns, 5-40 microns, and advantageously be varied in order to control diffusion and reaction time after activation.

In one embodiment according to the second aspect of the present invention, the number of moles of one of the barrier components that has been applied to the first section of the substrate is at least 10% higher, such as 20% higher, 30% higher, 40% higher, 50% higher, 100% higher, 200% higher, 400% higher or 800% higher than the number of moles of the same barrier component that has been applied to the second section of the substrate.

It is to be understood that if 4 moles of one barrier component is applied to the first section of the substrate and 2 moles of the same barrier component is applied to the second section of the substrate, the number of moles of the one barrier component that has been applied to the first section of the substrate is 100% higher than the number of moles of the same barrier component that has been applied to the second section of the substrate.

In another embodiment according to the second aspect of the present invention, the dry weight of the one or more barrier components that has been applied to the first section of the substrate is at least 10% higher, such as 20% higher, 30% higher, 40% higher, 50% higher, 100% higher, 200% higher, 400% higher or 800% higher than the dry weight of the one or more barrier components that has been applied to the second section of the substrate. In one embodiment, the dry weight of the at least one barrier component refers to the total weight of the one or more barrier components that has been applied to the section of the substrate in question after removal of any dissolution medium.

In another embodiment according to the second aspect of the present invention, the dry weight of one of the barrier components that has been applied to the first section of the substrate is at least 10% higher, such as 20% higher, 30% higher, 40% higher, 50% higher, 100% higher, 200% higher, 400% higher or 800% higher than the dry weight of the same barrier components that has been applied to the second section of the substrate. In one embodiment, the dry weight of the one barrier component refers to the weight of that barrier components which has been applied to the section of the substrate in question after removal of any dissolution medium.

In one embodiment according to the second aspect of the present invention, the first agent:one of the barrier components:the second agent molar ratio of the first section of the substrate is different from the first agent:one of the barrier components:the second agent molar ratio of the second section of the substrate.

It is to be understood that the term "one of the barrier components" which has been applied to the first section is the same component as "one of the barrier components" which has been applied to the second section of the substrate. It is to be understood that a first agent:one of the barrier components:the second agent molar ratio of 1:1:1 is different from a first agent:one of the barrier components:the second agent molar ratio of 1:2:1.

In one embodiment according to the second aspect of the present invention the first agent:second agent molar ratio of the first section of the substrate is different from the first agent:second agent molar ratio of the second section of the substrate; and the number of moles of one of the barrier component that has been applied to the first section is identical to the number of moles of the same barrier component that has been applied to the second section of the substrate.

In another embodiment according to the second aspect of the present invention, the first agent:second agent molar ratio of the first section of the substrate is different from the first agent:second agent molar ratio of the second section of the substrate; and the dry weight of one of the barrier components that has been applied to the first section is identical to the dry weight of the same barrier component that has been applied to the second section.

In one embodiment according to the second aspect of the present invention, the first agent:second agent molar ratio of the first section of the substrate is identical to the first agent:second agent molar ratio of the second section of the substrate; and the number of moles of one of the barrier components that has been applied to the first section of the substrate is different from the number of moles of the same barrier component that has been applied to the second section of the substrate.

In another embodiment according to the second aspect of the present invention, the first agent:second agent molar ratio of the first section of the substrate is identical to the first agent:second agent molar ratio of the second section of the substrate; and the dry weight of one of the barrier components that has been applied to the first section of the substrate is different from the dry weight of the same barrier component that has been applied to the second section of the substrate.

In one embodiment according to the second aspect of the present invention, the at least one barrier component is not dissolved in a dissolution medium during application. In another embodiment according to the present invention, the at least one barrier component is dissolved in a dissolution medium during application, the dissolution medium being removed by suitable means after application. Suitable means for removing the dissolution medium may be to dry the substrate, e.g. at room temperature, or optionally to subject the substrate to heat in order to remove the dissolution medium. A man skilled in the art will easily know a number of ways to remove the dissolution medium without negatively affecting the structure of either the first or second agent.

In one embodiment according to the present invention, the first agent and/or second agent and/or the at least one barrier component is dissolved in a dissolution medium during application. Complete removal of the dissolution medium is not mandatory. In fact, any residual amount of dissolution medium may give a change in the property of the one or more barrier components. By having different amounts of residual dissolution medium in said first and second section of the substrate, the diffusion coefficient of said first agent in the one or more barrier components in the first section of the substrate may be different from the diffusion coefficient of said first agent in the one or more barrier components in the second section of the substrate. Optionally, by having different amounts of residual dissolution medium in said first and second section of the substrate, the diffusion coefficient of said second agent in the one or more barrier components in the first section of the substrate may be different from the diffusion coefficient of said second agent in the one or more barrier components in the second section of the substrate. The difference may e.g be caused by hygroscopic properties of the one or more barrier components. If the amount of residual dissolution medium is not sufficient for the first agent and the second agent to react when brought in contact, the TTI system will be in inactive state although some residual dissolution medium may be present. However, if the amount of residual dissolution medium is sufficient for the first agent and the second agent to react when brought in contact, the TTI system will be in an active state.

In one embodiment according to the second aspect of the present invention, the at least one barrier component is applied to the substrate by printing, e.g. by inkjet, offset, flexo, silkscreen, gravure, folio and/or spray printing; or coating.

In the event the one or more barrier components constitute a mixture of components the number of moles is defined for each component if not stated otherwise.

Substrate

The term "substrate" refers to the supporting material onto which the reagents are applied. In one embodiment according to the present invention the substrate is selected from the group consisting of paper; coated paper such as paper coated with any plastics such as PE, PP, Polyester, fatty acids, oils, emulsifiers or lacquers; cardboard; plastics, such as PE, PP, Polyester; metal; silicon; ceramics; fabrics; textiles; and glass. The substrate may be smooth, rough, patterned or any combination thereof. The substrate may be surface treated i.e. surface treated with corona treatment.

In one embodiment according to the present invention the substrate is paper, the paper being selected from the group consisting of plain paper, ink jet-ready specialty coated papers (microporous and polymer-coated), synthetic papers, magazine-type glossy papers and calendared papers and cardboard. In one preferred embodiment according to the present invention, the substrate is milk cartons such as PURE-PAK® packing system cartons, juice cartons, labels such as products packaging labels or adhesive coated plastic. In one embodiment according to the present invention the substrate is selected from the group consisting of paper, cardboard, plastic, metal, silicon, ceramics and glass, with or without surface treatment such as lacquer, corona treatment or other means.

In another embodiment according to the present invention the substrate is plastics, such as laminate plastics, wherein the first agent, second agent and/or the at least one barrier component are applied to the substrate by printing. The printing may be performed simultaneously with printing of decorative colors.

The substrate may be pre-printed with a variety of colors. The substrate may be part of a product label or packaging material for a product.

Applying to a Substrate

The term "applying to a substrate" refers to the action taken when an agent is put on top of or deposited onto a substrate. Agents that are put on top of or deposited onto a substrate may migrate into the substrate fully, partially or minimally depending on the properties of the agent and the properties of the substrate. It is to be understood that in the context of the present invention, a second agent that is put on top of or deposited onto a first agent that has already been applied to the substrate will still be considered to be applied to the substrate even though the second agent may not be in direct contact with the substrate.

One example of applying an agent to a substrate is by printing. There are a number of available printing methods on the market today like inkjet, offset, flexo, silkscreen, gravure, folio or spray printing. When using a conventional inkjet the inks in the ink cartridge is typically replaced by the agents which are to be applied to or deposited onto the substrate.

In one embodiment according to the present invention, the first agent and the second agent are not dissolved in a dissolution medium during application.

In another embodiment according to the present invention, the first agent and the second agent are dissolved in a dissolution medium during application, the dissolution medium being removed by suitable means after application.

In another embodiment according to the present invention, one of said first and second agent is dissolved in a dissolution medium during application, the dissolution medium being removed by suitable means after application; and the other agent is not dissolved in a dissolution medium during application.

In one embodiment according to the present invention, the first agent and the second agent are applied to the first and second section of the substrate in an overlapping position. In the context of the present invention, the term "overlapping position" means that two agents are placed on top of each other. The term "on top of each other" does not necessarily mean that they are in direct contact, as the two agents may be separated by an intermediate layer. In one embodiment according to the present invention, the first agent and the second agent are applied to the first and second section of the substrate in an overlapping position in such a way that they are in direct contact with each other.

In one embodiment according to the present invention, the first agent, the second agent and the one or more barrier components are applied to the first and second section of the substrate in an overlapping position. The first agent and the second agent are preferably being in direct contact with the one or more barrier components but not in direct contact with each other.

First Agent and Second Agent

The first agent and the second agent have been applied to at least the first and the second section of the substrate. The first agent and the second agent provides a visual change in appearance, such as a change in color, when brought in contact in the presence of a solvent.

In certain embodiments the present invention provides a TTI system, wherein
the first agent is a reducing agent, such as thiosulfate (e.g. sodium thiosulfate); and the second agent is an agent which changes visual appearance upon reduction, such as iodine-starch complex;
the first agent is an oxidizing agent; and the second agent is an agent which changes visual appearance upon oxidation;
the first agent is a salt; and the second agent is an agent which changes visual appearance when forming a complex with the salt; or
the first agent is a salt; and the second agent is an agent which changes visual appearance when forming a precipitate with the salt; or
the first agent is an acid, base or any mixture thereof; and the second agent is an agent which changes visual appearance upon a change in pH.

In certain embodiments the present invention provides a TTI system, wherein one of said first and second agent is a $Fe^{3+}$ or $Cu^{2+}$ salt and the other agent is $FeCN_6^{4-}$ salt. In other embodiments the present invention provides a TTI system, wherein one of said first and second agent is Iodide and the other agent is a $Cu^{2+}$ salt. In other embodiments the present invention provides a TTI system, wherein one of said first and second agent is Sulphate, Carbonate or Phosphate and the other agent is a $Ca^{2+}$ salt. In other embodiments the present invention provides a TTI system, wherein one of said first and second agent is Glucose, Fructose or Thiosulfate (e.g. sodium thiosulfate) and the other agent is Iodine. In other embodiments the present invention provides a TTI system, wherein one of said first and second agent is a $Fe^{2+}$ salt and the other agent is a $FeCN_6^{3-}$ salt. In other embodiments the present invention provides a TTI system, wherein one of said first and second agent is a $FeCN_6^{3-}$ salt and the other agent is a $Fe^{2+}$ salt.

In other embodiments the present invention provides a TTI system, wherein one of said first and second agent is Glucose, Fructose or Thiosulfate (e.g. sodium thiosulfate) and the other agent is $Cu^{2+}$.

The term "agent which changes visual appearance upon oxidation" or "agent which provides a visual change in appearance, such as a change in color, upon oxidation" refers to an agent which changes visual appearance, e.g. a change in color and/or change in phase, upon oxidation.

The term "agent which changes visual appearance upon reduction" or "agent which provides a visual change in appearance, such as a change in color, upon reduction" refers to an agent which changes visual appearance, e.g. a change in color and/or change in phase, upon reduction. One example of such an agent is starch-complexed iodine which upon reduction changes colour from dark blue to transparent/colorless. Another example of such an agent is a solution of $Cu2^+$ which upon reduction may precipitate and change color to red $Cu_2O$. Ferroin is an example of a pH independent agent which upon reduction changes colour from slightly blue to red and methylene blue is an example of a pH dependent agent which changes colour from blue to colourless upon reduction.

Other suitable agents which changes colour upon reduction are 2,2'-Bipyridine(Ru or Fe complexes); Nitroferroin; 5,6-Dimethylferroin; Phenylanthranilic acid; Ethoxy chrysoidine; o-Dianisidine; Sodium diphenylamine sulfonate; Viologen; Diphenylbenzidine; Diphenylamine; Sodium 2,6-Dibromophenol-indophenol; Sodium 2,6-Dichlorophenol-indophenol; Sodium o-Cresol indophenol; Thionine; Indigotetrasulfonic acid; Indigotrisulfonic acid; Indigo carmine; Indigomono sulfonic acid; Phenosafranin; Safranin; Neutral red; variamine blue; potassium permanganate; xylenol orange; and xylene cyanol.

The term "reducing agent" refers to an agent that is capable of donating an electron to another chemical species in a redox chemical reaction. In context of the present specification the reducing agent must be capable of donating an electron to the agent which changes visual appearance upon reduction. One example of a reducing agent is a mutarotational reducing agent. Other examples of reducing agents may be thiosulfate (e.g. sodium thiosulfate), such as sodium thiosulfate (e.g. sodium thiosulfate), or ascorbic acid.

The term "mutarotational reducing agent", refers to an agent which is able to undergo mutarotation and which also is able to donate an electron or electrons to another specie in a reduction-oxidation reaction. Examples of mutarotational reducing agents are a reducing sugar or a mixture of reducing sugars, a non-reducing sugar which can be converted to a reducing sugar by tautomerization or a mixture of non-reducing sugars which can be converted to reducing sugars by tautomerization.

The term "tautomerization", refers to the chemical reaction where tautomers, isomers of organic compounds, readily interconvert. It is common that this reaction results in the formal migration of a hydrogen atom or proton, accompanied by a switch of a single bond and adjacent double bond. The concept of tautomerizations is called tautomerism.

Said sugar is preferably selected from a monosaccaride, disaccharide, trisaccaride, oligosaccharide, polysaccharide or any mixture thereof.

More preferably, the mutarotational reducing agent is a reducing sugar selected from the group consisting of glucose, fructose, glyceraldehyde, galactose, lactose and maltose; or any mixture thereof. In a particularly preferred embodiment, the mutarotational reducing agent is fructose.

In order for the mutarotational reducing agent to be able to donate electrons to the agent which changes visual appearance upon reduction, the mutarotational reducing agent must have an open chain with an aldehyde or a ketone group. This is typically the case for the intermediate product of a mutarotation process.

The mutarotation process rate is both dependent on temperature and pH. By increasing the temperature and/or pH, more intermediate products (open chain with an aldehyde or a ketone group) are formed resulting in an increased redox reaction rate. Said intermediate products then donate electrons to the agent which changes visual appearance upon reduction.

Since the mutarotation process rate is dependent on pH, the pH may be adjusted to fine tune the time-temperature indicator system of the present invention.

According to the present invention, the first agent and the second agent will provide a visual change in appearance, such as a change in color, when brought in contact in the presence of a solvent. In the absence of a solvent, the first agent and the second agent will not react, thereby no visual change in appearance. Thus, in the presence of a solvent the time-temperature indicator (TTI) system will be in an active state while it will be in an inactive state in the absence of a solvent. In the context of the present invention, the term "absence of a solvent" may still include small amounts of solvent. Said small amount of solvent typically being solvent that is tightly associated to the substrate, first agent, second agent and/or one or more of the barrier components and therefore difficult to remove without negatively affecting the functioning of the TTI. If the amount of solvent is not sufficient for the first agent and the second agent to react when brought in contact, the TTI system will be in an inactive state. However, if the amount of solvent is sufficient for the first agent and the second agent to react when brought in contact, the TTI system will be in an active state. It is to be understood that certain amount of fluid may be present and the TTI system still being in an inactive state.

In one embodiment according to the present invention, the time-temperature indicator (TTI) system is being activated by applying a solvent to at least the first and the second section of the substrate.

In one embodiment according to the present invention, the solvent is selected from the group consisting of water, glycerol or any combination thereof. The solvent may also further comprise a pH modifying agent.

The term "pH modifying agent" refers to an agent which is able to change the pH of the surrounding environment. Examples of a pH modifying agent is a buffer, e.g. an alkaline buffer; weak or strong base; and weak or strong acid. Of particular interest are alkaline buffers such as carbonate buffers, e.g. sodium carbonate buffer or a potassium carbonate buffer, borax buffers or CAPS buffers.

According to other embodiments, the present invention provides a time-temperature indicator (TTI) system, wherein
  the substrate is selected from the group consisting of paper, coated paper, plastics, cardboard, metal, silicon, ceramics, fabrics, textiles, glass or any combination thereof;
  the first agent and the second agent are dissolved in a dissolution medium during application, the dissolution medium being removed by suitable means after application thereby providing a time-temperature indicator (TTI) system in inactive state;
  the first agent is a mutarotational reducing agent, such as fructose; the second agent is an agent which changes visual appearance upon reduction, such as a iodine-starch complex; wherein a pH modifying agent which modifies the pH of the agent to less than 8; less than 7; less that 6; less than; less than 4 is added to at least one of the first and second agent prior to application to the substrate;
  the time-temperature indicator (TTI) system is activated by applying a solvent to at least the first and the second section of the substrate and the solvent comprises a pH modifying agent which modifies the pH of the activated system to above 8, above 9, above 10 or above 11.

It is to be understood that the amount of pH modifying agent added to at least one of the first and second agent prior to application to the substrate may be the same in each of said first and second section of the substrate; or the amount of pH modifying agent which is added to said first section is different from the amount added to the second section of the substrate.

In another embodiment of the present invention, a pH modifying agent is added to the first and second section of the substrate thereby ensuring a low pH, such as a pH below 8, below 7 or below 6 in said sections prior to activation. The amount of pH modifying agent added to at least one of the first and second agent prior to application to the substrate may be the same in each of said first and second section of the substrate; or the amount of pH modifying agent which is added to said first section is different from the amount added to the second section of the substrate. The TTI system may then be activated by applying a solvent to at least the first and the second section of the substrate, the solvent comprising a pH modifying agent which modifies the pH of the activated system to a high pH, such as above 8, above 9 or above 10.

In another embodiment according to the present invention, surface active materials such as emulsifiers, surfactants or polymers which may improve application of ingredients onto certain hydrophobic material such as plastics, coated cartons, extrusion coated cartons; glass; ceramics may be added to the first agent, second agent and/or the one or more barrier components before application to substrate.

In another embodiment according to the present invention, solidifying or gelling materials or gelling material compositions may be added to the first agent, second agent and/or one or more of the barrier components before application to substrate. Examples include i) addition of alginate to the first agent and/or second agent and the addition of $Ca^{2+}$ to one or more of the barrier components; ii) addition of $Ca^{2+}$ to the first agent and/or second agent and the addition of alginate to the one or more barrier components; or iii) addition of gelatin or carrageenans to the first agent, second agent and/or one or more of the barrier components thus providing a gelled material on the substrate.

In another embodiment according to the present invention, easily rehydratable compounds such as hydrophilic polymers and swelling or super-swelling particles such as crosslinked Na-polyacrylate, crosslinked CMC, crosslinked starches, Na-starch glycolate or crosslinked polyvinylpyrrolidone are added to the first agent, the second agent and/or one or more of the barrier components prior to application to the substrate.

In another embodiment according to the present invention a mixture of solvents are used wherein the solvent mixture may aid the drying process ie. by enabling less energy to be applied to complete the drying process. The solvents in the mixture may act as solvents or non-solvents and are added to the first agent, the second agent and/or the one or more barrier components prior to application to the substrate.

In another embodiment according to the present invention compounds which attract solvent such as easily rehydrateable compounds such as hydrophilic polymers and swelling or super-swelling particles such as crosslinked Na-polyacrylate, crosslinked CMC, crosslinked starches, Na-starch glycolate or crosslinked polyvinylpyrrolidone and a non-solvent are added to the first agent, the second agent and/or the one or more barrier components prior to application to the substrate. The non-solvent may be added in a level sufficient to avoid significant swelling of the easily rehydratable compounds. In this embodiment the compounds may be applied e.g. in a printing process, and potentially dried. Upon a subsequent activation the easily rehydratable particles may be rehydrated and swelled by picking up moisture in the activation process.

In another embodiment according to the present invention a separate layer may be deposited onto the substrate prior to the first agent, the second agent and/or the one or more barrier components e.g with a printing process or a coating process, wherein the layer comprises easily rehydratable compounds such as hydrophilic polymers and swelling or super-swelling particles such as crosslinked Na-polyacrylate, crosslinked CMC, crosslinked starches, Na-starch glycolate or crosslinked polyvinylpyrrolidone and a non-solvent in levels sufficient to avoid significant swelling of the easily rehydratable compounds. In one embodiment the easily rehydratable compounds are moisturized in the activation process, thus picking up water to a significant degree. This may allow the system to swell to a significant degree. This may allow the system to retain water after the activation step.

The easily rehydratable compounds in the embodiments may swell to a significant degree such as more than 50%; more than 100%, more than 200%, more than 400%, more than 1000% based on the dry matter of the compounds. The easily rehydratable compounds in the embodiments may swell to a significant degree such that in the range of 50%-2500%, in the range of 100%-1500%, in the range of 100%-1000%, or in the range of 200%-1000% based on the dry matter of the compounds.

In another embodiment according to the present invention, one or more compounds of high molecular weight, i.e. higher molecular weight than 100 Da, 500 Da, 1000 Da, 5000 Da or 10000 Da or complexed compounds is added to the first agent, the second agent and/or the one or more barrier components prior to application to the substrate.

In one embodiment according to the present invention, the first agent and/or the second agent is dissolved in a mixture of water and glycerol. The amount of water is preferably less than 40% by weight, such as e.g. less than 30% by weight, less than 20% by weight or less than 10% by weight. It is preferred that the content of glycerol is not less than 50% by weight, such as not less than 60% by weight, not less than 70% by weight or not less than 80% by weight.

In one embodiment according to the present invention, the first agent and/or the second agent is dissolved in less than 40% by weight water, such as e.g. less than 30% by weight, less than 20% by weight or less than 10% by weight. It is preferred that the content of glycerol is higher than 50% by weight, such as higher than 60% by weight, higher than 70% by weight or higher than 80% by weight.

High level of water in dissolved first agent and/or dissolved second agent may result in uncontrolled color reduction and fast evaporation of water from the TTI system while high level of glycerin significantly slows down evaporation and drying out effects of TTI systems.

In one embodiment according to the present invention, the first agent and the second agent are not dissolved in a dissolution medium during application.

In another embodiment according to the present invention, the first agent and the second agent are dissolved in a dissolution medium during application, the dissolution medium being removed by suitable means after application.

In another embodiment according to the present invention, one of said first and second agent is dissolved in a dissolution medium during application, the dissolution medium being removed by suitable means after application; and the other agent is not dissolved in a dissolution medium during application.

Sections

Figure 6C:
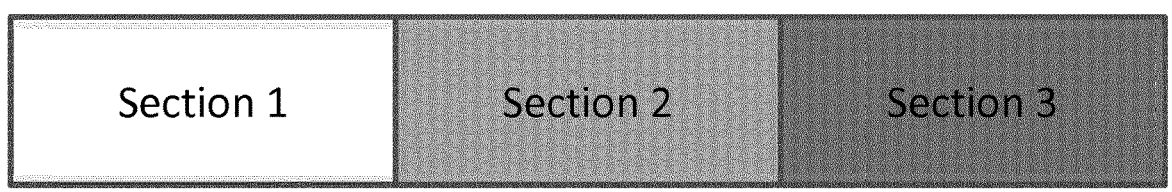
FIG. 6c illustrates a time temperature indicator system according to the present invention comprising a substrate having 3 sections.

The time-temperature indicator (TTI) system according to the present invention comprises a substrate having at least two sections. A time-temperature indicator (TTI) system comprising a substrate having three sections is illustrated in FIG. 6c.

In one embodiment according to the present invention the time-temperature indicator (TTI) system comprises a substrate having at least three sections, such as at least four, at least five, at least six, at least seven, at least eight, at least nine, at least 10, at least 15, at least 20, at least 25, at least 30 or at least 50 sections.

In one embodiment according to the present invention the time-temperature indicator (TTI) system comprises a substrate having a number of sections in the range of 3-10000; in the range of 3-1000; in the range of 3-100 or in the range of 3-20.

In one embodiment according to the present invention, the first and second sections are preferably adjacent to each other and/or in close proximity to each other on the substrate.

Gradient

In one embodiment according to the present invention, the number of moles of the first agent that has been applied to the first section of the substrate is at least 10% higher, such as 20% higher, 30% higher, 40% higher, 50% higher, 100% higher, 200% higher, 400% higher or 800% higher than the number of moles of the first agent that has been applied to the second section of the substrate. It is to be understood that if 4 moles of the first agent is applied to the first section of the substrate and 2 moles of the first agent is applied to the second section of the substrate, the number of moles of the first agent that has been applied to the first section of the substrate is 100% higher than the number of moles of the first agent that has been applied to the second section of the substrate.

In one embodiment according to the present invention, the number of moles of the second agent that has been applied to the first section of the substrate is at least 10% higher, such as 20% higher, 30% higher, 40% higher, 50% higher, 100% higher, 200% higher, 400% higher or 800% higher than the number of moles of the second agent that has been applied to the second section of the substrate.

In one embodiment according to the present invention, the number of moles of the first agent that has been applied to the first section divided by the number of moles of the second agent that has been applied to the first section is at least 10% higher, such as 20% higher, 30% higher, 40% higher, 50% higher or 100% higher than the number of moles of the first agent that has been applied to the second section divided by the number of moles of the second agent that has been applied to the second section.

In another embodiment according to the present invention, the first agent:second agent molar ratio of the first section of the substrate is different from the first agent: second agent molar ratio of the second section of the substrate.

The reference to mole is intended to refer to the number of molecules that has been applied to the substrate.

Order of Application

In one embodiment according to the first aspect of the present invention, the first agent and the second agent are sequentially being applied to the substrate. One example being that the first agent is applied to the substrate prior to applying the second agent. Another example being that the second agent is applied to the substrate prior to applying the first agent.

In one embodiment according to the first aspect of the present invention, the first agent, the second agent and the one or more barrier components are sequentially being applied to the substrate. One example being that the first agent is applied to the substrate prior to applying the one or more barrier components and the second agent; and that the one or more barrier components is applied to the substrate prior to applying the second agent, i.e the second agent constitutes the last layer in the sandwich-like structure. Another example being that the second agent is applied to the substrate prior to applying the one or more barrier component and the first agent; and that the one or more barrier component is applied to the substrate prior to applying the first agent, i.e the first agent constitutes the last layer in the sandwich-like structure.

Humidifiers/Protective Layer

In another embodiment according to the present invention, the time-temperature indicator (TTI) system according to the first or second aspect of the present invention is coated with an oil-in-water or water-in-oil emulsion or suspension wherein the coating comprises humidifiers. The coating may comprise waxy, hydrophobic components making it suitable as a water barrier for agents that have been applied to the substrate.

In one embodiment according to the present invention, one or more solvents (humidifying agent(s)) is added to the first agent, the second agent and/or the one or more barrier component prior to application to the substrate. Said humidifying agent(s) preferably being selected from the group consisting of water, glycerol or any mixture thereof. By including a humidifying agent the time-temperature indicator (TTI) system may be printed onto packaging at the packaging line without need for additional activation processes.

A protective layer may be applied to the TTI system in order to make sure that an activated TTI system according to the present invention remains active. The purpose of the protective layer being to retain moisture and avoid that the TTI system dries and is inactivated.

In one embodiment according to the present invention, the protective layer is on top of and covers the reagents applied to the substrate. Preferably the protective layer is applied on top of the other layers.

The protective layer is preferably selected from hydrophobic or hydrophilic films or film forming substances. Examples of films may be pre-manufactured polymer films in the form of in example laminate films, adhesive tape material, or other. Examples of film forming substances are hydrophobic substances such as hydrophobic polymers such as Polytetrafluoreten (PTFE), Polyetylen (PE), Prolypropylene (PP), waxes, oils or hydrophilic materials such as carboxymethyl cellulose, micro-crystalline cellulose, methyl cellulose, alginate, carrageenan, gelatin, hydroxypropylmethyl cellulose, starches, corn protein, soy protein, casein, glutein, cyclodextrins, cithosan, lecithin, phospholipids, hydro-gels, sol-gels, gum Arabic and agarose dissolved in a solvent or mixture of solvents.

In one embodiment according to the present invention, one or more humidifiers may be included in the protective layer.

Other

In one embodiment according to the present invention, the time-temperature indicator system according to the present invention is dried. It is sufficient to allow the TTI system to dry for 2 hours at room temperature. When the TTI system has been dried, the TTI system is inactive and may be stored for later use. Surprisingly it has been shown that the TTI system in its dried state may be stored for a prolonged period of time and still provide a visual response to time and temperature upon activation with a suitable solvent.

When a dried TTI system according to the present invention is to be activated in order to monitor the time and temperature exposure of food and other products the TTI system may be activated by applying a solvent to at least the first and the second section of the substrate. The dried TTI system may e.g. be activated by adding water, glycerol or any mixture thereof as solvent(s).

A TTI in inactive state is typically a dried or partly dried TTI. The TTI is typically transformed into an active state by applying a solvent to at least the first section and the second section of the substrate.

In one embodiment according to the present invention, the term "solvent" is replaced by the term "activation fluid". Solvent and activation fluid may therefore be used interchangeably herein.

In one embodiment according to the present invention, the solvent is applied to the substrate by use of
 a. roller deposition, i.e using an anilox roller
 b. spraying, ie. using at least one precision spray nozzle or an array of nozzles
 c. a mist-chamber
 d. a scraper dispensing unit, or
 e. a coating unit ie. a unit which coat a surface with a pre-defined coating thickness wherein the substrate thereafter may be coated with a sealant to avoid evaporation or loss of the solvent. The sealant may comprise a
 a) top laminate layer
 b) spray coated coating
 c) lacquer
 d) wax or
 e) Hydrophobic coating, or be a different sealant wherein the sealant reduces the rate of evaporation of solvent to the surroundings with at least 10%, at least 25%, at least 50% more preferably at least 80%, most preferably at least 90%.

In another embodiment according to the present invention the inactive TTI may be transformed into an active state by applying a dispersion, such as an emulsion or suspension, to at least the first and second sections of the substrate where the dispersion comprises both a solvent and a coating layer component. The dispersion may destabilize over time or with the use of heat, freezing, radiation, vibration, vacuumisation or pressure. The dispersion may separate into 2 phases wherein the phase comprising at least one solvent activates the indicator and the phase comprising at least one coating layer component acts as a protective layer for the indicator system.

In yet another embodiment according to the present invention the inactive TTI may be transformed into an active state by adding an external film to the substrate where the external film is comprising a solvent, such as an external label comprising a solvent. The solvent may be included in the adhesive of the external label or may be added in a separate step to the external label. The label may be placed party of completely on top of at least the first and second section of the substrate. Preferably, the label covers all parts of at least the first and second section of the substrate.

In another embodiment according to the present invention where the inactive TTI is laminated on both sides with a sealing layer, the inactive TTI may be transformed into an active state by adding a solvent by means of puncturing the outer sealing layer. This may be done by means of needles, rollers, blades, knives, scratching devices. Optionally, the inactive TTI may be transformed into an active state by injecting the solvent through the laminated layer and into the substrate, i.e. by microinjection of a solvent through one of the laminates and into the substrate thereby activating the indicator. The size and shape of the needles are preferably small enough such that the solvent is sufficiently entrapped during the lifespan of the indicator. However, the area of activation may additionally be coated with sealing layer if needed.

Figure 8A:
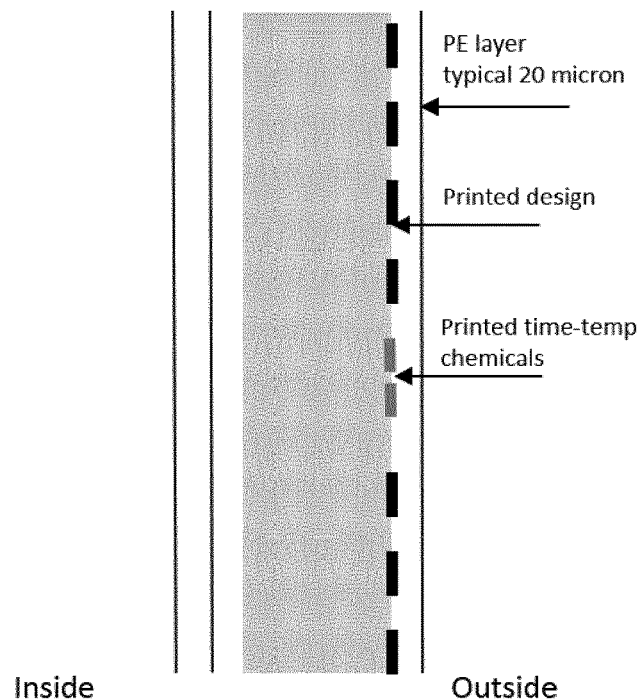
FIGS. 8a, 8b and 8c illustrate an activation process for a laminate-coated substrate wherein chemicals are applied to the substrate by printing, the indicator is activated through puncturing the laminate and adding the solvent; and optionally re-sealing the punctured outer layer by means of an external coating.
Figure 8B:
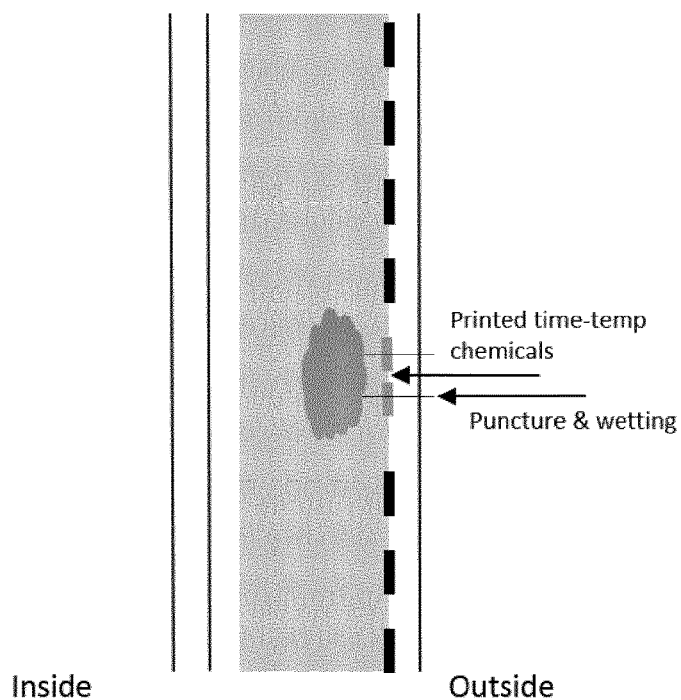
Figure 8C:
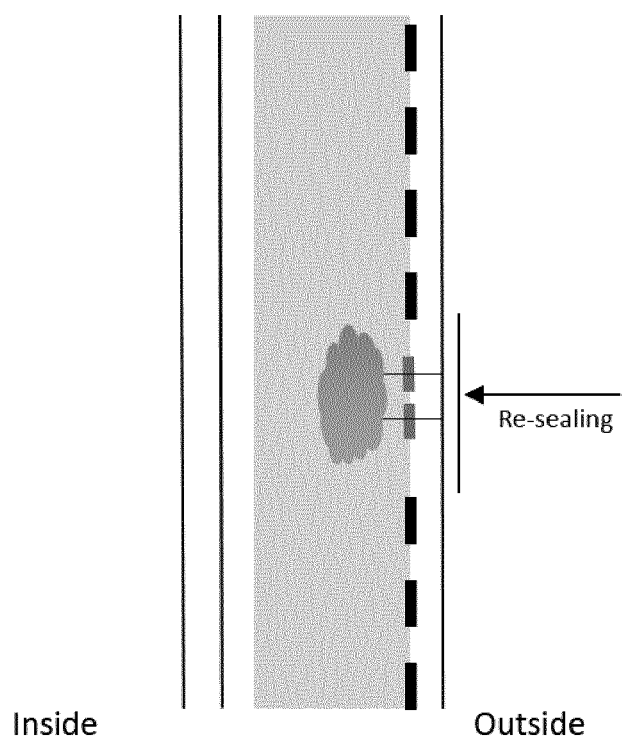

In one embodiment according to the present invention, the time-temperature indicator (TTI) system comprises a substrate, such as carton, to which at least a first agent and a second agent have been applied using a printing process such as flexography, offset printing or inkjet. If decorating inks are to be applied to the same substrate, the decorating ink(s) may be applied to the substrate in the same process or process line. In order to transform the TTI system into an inactive state (suitable for storage), the first agent, second agent and optionally the standard decorating inks are dried by removal of solvent i.e. during a drying process (see FIG. 8a). The substrate is then laminated with at least one layer of polymer, such as polyethyelene; a layer of metal such as aluminum or a combination thereof. Optionally, the TTI system is stored for a period of time and transported to a product producer. The TTI system is then transformed into an active state by puncturing the outer layer of the laminated layer followed by introduction of a solvent to the substrate, where the substrate may act as solvent storage medium for the duration of the indicator reaction time (see FIG. 8b). The punctured layer may then be re-sealed by means of an external coating such as a spray of liquid polymer or such as a sealing tape (see FIG. 8c).

In one embodiment according to the present invention the first agent and the second agent is associated to the substrate, e.g. through covalent bonding, e.g. by being associated to the substrate fibers which will provide support for the two agents.

In certain embodiments, at 0-4° C., the time needed for the visual change in appearance to be completed is in the range of 0-100 days, in the range of 0-50 days, in the range or 1-25 or in the range of 5-20 days.

According to one embodiment of the invention, the first agent, the second agent and optionally the one or more barrier components are applied to the substrate in an area dose to the conventional date mark such as the flange of a milk carton.

According to one embodiment, at least one of the laminate layers has an area without a laminating layer, i.e. at least one hole. This area may be activated using a solvent without an additional puncturing and subsequently may be coated with a laminating layer such as and external label.

The TTI system may be in the form of a separate label, a TTI system included in a product label, TTI system printed onto or sandwich printed into a product package laminate layer or a TTI system printed onto carton or paper and laminated with plastic laminates as in the case of a milk carton.

In one embodiment according to the present invention the substrate is an external label. After the TTI system (external label) has been manufactured, the manufactured TTI system may be dried and stored. The external label is activated by adding a solvent (moisture) and applied to package at time of packaging.

In another embodiment according to the present invention, the TTI system is manufactured in the same process as product packaging thus combining the TTI system with the product or product label in a single operation.

In another embodiment according to the present invention, the TTI system is manufactured and the substrate is cut into smaller pieces and combined with an adhesive tape, transformed into an active state and attached to a food packaging product.

In another embodiment according to the present invention the substrate is a transparent or semi-transparent tape. The TTI system is typically manufactured by applying the first agent, second agent and optionally the one or more barrier components to the glueside of the transparent or semi-transparent tape. After the TTI system (transparent or semi-transparent tape) has been manufactured, the manufactured TTI system may be dried and stored. The external label is activated by adding a solvent (moisture) and glueside of the tape attached to the packaging material.

In one embodiment according to the present invention the at least two sections have the shape of animals such as fish, cows or chicken. In this embodiment, the product packaging may comprise a printed animal which partially is visually changed or removed with time and temperature exposure or a stock of animals wherein the animals are individually visually changed or removed with time and temperature exposure.

It is understood that the sections of the substrate and the substrate per se may take the form of any geometrical figure and may even have different shape from section to section.

In one aspect the geometrical figures are represented as pixels in a picture wherein the pixels and picture may change with time and temperature exposure.

In another embodiment according to the present invention, the at least two sections have the shape of bar codes or QR codes which may change over time and be readable by conventional or modified readers in the distribution chain and at consumers. Information to be extracted may be e.g average temperature, time since manufacture, as well as containing traditional information i.e. link to websites of farms. The at least two sections may also be square or rectangular and be a part of a code, such as a barcode or QR code.

It is to be understood that removal of dissolution medium and/or solvent to provide an inactive TTI system does not necessarily mean that all dissolution medium and/or solvent is removed. There may still be some dissolution medium and/or solvent left and still the TTI system is in an inactive state. If the dissolution medium and/or solvent is low enough to ensure that the first agent and the second agent does not react if brought into contact, the TTI system will be in an inactive state although some dissolution medium and/or solvent may still be present in the system. However, if the amount of the dissolution medium and/or solvent is sufficiently high so that the first agent and the second agent will react if brought into contact, the TTI system will be in an active state.

One embodiment according to the present invention relates to a time-temperature indicator (TTI) system comprising a first substrate to which at least a first agent has been applied and a second substrate to which a second agent have been applied; the substrates having at least a first and a second section;
wherein
the first agent has been applied to at least the first and the second section of the first substrate and the second agent has been applied to at least the first and the second section of the second substrate;
the first agent and the second agent provides a visual change in appearance, such as a change in color, when brought in contact in the presence of a solvent; and
the number of moles of the first agent that has been applied to the first section of the first substrate is different from the number of moles of the first agent that has been applied to the second section of the first substrate; or
the number of moles of the second agent that has been applied to the first section of the second substrate is different from the number of moles of the second agent that has been applied to the second section of the second substrate;
said first and second substrates are preferably brought in contact with each other thereby forming a sandwich-like structure wherein
the first agent and the second agent are facing the contact surface between said first and second substrates;
the first agent and the second agent being in an overlapping position in the sandwich-like structure.

One embodiment according to the present invention relates to a time-temperature indicator (TTI) system comprising a first substrate to which at least a first agent has been applied and a second substrate to which a second agent have been applied; the substrates having at least a first and a second section;
wherein
the first agent has been applied to at least the first and the second section of the first substrate, the second agent has been applied to at least the first and the second section of the second substrate and at least one barrier component has been applied to at least the first and the second section of the first substrate, the second substrate or both;
the first agent and the second agent provides a visual change in appearance, such as a change in color, when brought in contact in the presence of a solvent; and
the number of moles of the first agent that has been applied to the first section of the first substrate is different from the number of moles of the first agent that has been applied to the second section of the first substrate; or
the number of moles of the second agent that has been applied to the first section of the second substrate is different from the number of moles of the second agent that has been applied to the second section of the second substrate; or
the number of moles of one of the barrier components that has been applied to the first section of the first or second substrate is different from the number of moles of the same compound that has been applied to the second section of the first or second substrate respectively;
said first and second substrates are preferably brought in contact with each other thereby forming a sandwich-like structure wherein
the first agent and the second agent are facing the contact surface between said first and second substrates;
the first agent and the second agent being in an overlapping position in the sandwich-like structure; or
the first agent and the second agent being separated by the one or more barrier components which regulates the rate at which said first and second agents are brought into contact.

In one embodiment according to the present invention, the first agent and/or second agent is not dissolved in a solvent but instead being dispersed such as emulsified or suspended, or being solubilized, such as in micellar solubilization.

In one embodiment according to the present invention, the first agent and/or second agent may per se be a solvent. In such a case the solvent is preferably not dried to a significant amount. An example of such a solvent may be a solvent which does not evaporate easily.

In another embodiment according to the present invention, the first agent, second agent or the at least one barrier component further comprises a polymeric material which can modify the rheological properties of the system. Such agents may be gel-forming or viscosifying polymers.

In another embodiment according to the present invention, the first agent, second agent or the at least one barrier component further comprises a filler which can modify the rheological properties and diffusion properties of the system. One such filler may be fumed silica.

In one embodiment according to the present invention, the first agent, and/or second agent may be applied to the substrate by compression.

A further aspect of the present invention relates to use of the time-temperature indicator system according to the present invention for monitoring the time and temperature to which a product has been exposed.

In a further aspect, the present invention provides a print ink set comprising:
a first print ink comprising the first agent and a second print ink comprising the second agent; or
a first print ink comprising the first agent, a second print ink comprising the second agent and a third print ink comprising the one or more barrier components.

In one embodiment according to the present invention, said print ink set is an inkjet ink set.

The invention will now be described by way of illustration in the following non-limiting examples.

EXAMPLES

Example 1

Time-Temperature Sensitivity
Chemicals:
Solution A: 25 mM Iodine ($I_2$), 150 mM potassium iodide (KI) and 2.5% starch solution was made by mixing 1 part of a 100 mM (I$_2$) and 600 mM potassium iodide (KI) solution, 1 parts 10% pre-heated and cooled starch solution and 2 part deionized water.

Solution B: 10% Fructose solution made by adding 1 part of Fructose to 9 parts of water.

Solution C: 0.75 M Carbonate buffer made by mixing 1 part of a 1.5M Carbonate buffer containing 0.75M Na$_2$CO$_3$ and 0.75M NaHCO$_3$ and 1 part of deionized water.

Preparing the TTI System (See FIG. 1)

A time-temperature sensitive indicator was printed using a Canon MP620 inkjet by
  a) inserting Solution A in the wide black cartridge completely rinsed of color,
  b) inserting Solution B in the Magenta cartridge completely rinsed of color
  c) inserting Solution C in the Cyan cartridge completely rinsed of color,
  printing solution A on the paper 1 time at area A1,
  printing solution B on the paper 1 time at area A1, and
  printing solution C on the paper 1 time at area A1
  by inserting a standard inkjet paper (HP office paper, white, A4, 80 g/m2 (M5A045-67 D3A0511A)) and subsequently printing at 100% saturation.

After printing the color appeared dry and appeared non-reactive.

The printed area A1 was activated by wetting the paper using deionizing water and the paper was covered with plastic and put for conditioning at 4 and 20° C.

Time-Temperature Sensitivity of the TTI System (See FIG. 1)

After approximately 12 hours at 20° C. the color at A1 was vanished. At 4° C. only minor color changes was observed after 48 hours.

Example 2

Activation with Varying Glycerin Concentrations, RT
  Chemicals:
  Solution A: 12.5 mM I$_2$; 1.25% starch
  12.5 mM Iodine (I$_2$), 75 mM potassium iodide (KI) and 1.25% starch solution was made by mixing 1 part of a 100 mM (I$_2$) and 600 mM potassium iodide (KI) solution, 1 parts 10% pre-heated and cooled starch solution and 6 parts deionized water.
  Solution B: 10% Fructose solution made by adding 1 part of Fructose to 9 parts of water.
  Solution C: Carbonate buffer at pH 9.
  Preparing the TTI System (See FIG. 2)
  A time-temperature sensitive indicator was printed using a Canon MP620 inkjet by
    a) inserting Solution A in the wide black cartridge completely rinsed of color,
    b) inserting Solution B in the Magenta cartridge completely rinsed of color
    c) inserting Solution C in the Cyan cartridge completely rinsed of color,
    printing chemicals at 5 different areas named A1; A2; A3; A4; A5 by
    printing solution A on the paper 3 times at area (A1-A5),
    printing solution B on the paper 1 time at area (A1-A5) and
    printing solution C on the paper 1 time at a first area (A1), 2 times at A2, 3 times at A3, 4 times at A4 and 5 times at A5
    by inserting a standard inkjet paper (HP office paper, white, A4, 80 g/m2 (M5A045-67 D3A0511A)) and subsequently printing at 100% saturation.

After printing the color appeared dry and appeared non-reactive.

The printed areas were activated by wetting the paper using 10%, 30%, 50% and 70% glycerin solution and put for conditioning at 20° C.

Activation with glycerin (see FIG. 2):

The A5 area activated with all glycerin solutions had nearly vanished after 6 hours and completely vanished after 11 hours with no visible variations seen in the reaction rate.

A1-A5 activated with 50 and 70% glycerin solution exhibit a gradual color reduction over time where color of A5 disappears after 6 hours, A3 after about 11 hours and A1 after about 17 hours.

The surface of areas activated with 10 and 30% glycerin solution was dry after 11 to 17 hours at 20° C., whereas the areas activated with 50 and 70% glycerin solution appeared moist. The reaction for the 10 and 30% glycerin solution did stop and no further reaction was seen after 17 hours at 20° C.

Example 3

TTI System without any Barrier Components: Different Concentrations of Fructose in Water-Glycerol Solution
  Chemicals:
  Solution A: 50 mM 12, 13.3% (w/w) starch.
  Solution C: 34% (w/w) Fructose in water-glycerol solution, 7% (w/w) water, pH=10.
  Preparing TTI System:
  TTI systems were printed using Flexo printer. TTI systems were printed on thin plastic white self adhesive labels. Iodine-starch (solution A) was first applied to the substrate. Fructose (solution C) was then applied to the substrate using different amounts according to different degree of raster of the printing plates (25%, 50%, 75% and 100% degree of saturation) in four different areas. Solution A was printed 3, 5 and 7 times. Solution C was printed 3 times (FIG. 3, results presented after one day at 4° C. and after 13 days at 4° C.).

It was observed that higher saturation of fructose results in faster color reduction. Activation was performed by printing solution C on the top of printed solution A.

Example 4

TTI System with a One or More Barrier Component: Different Thickness Layers of Solution B
  Chemicals:
  Solution A: 50 mM 12, 13.3% (w/w) starch.
  Solution B: Fructose 68% (w/w) in water (barrier component).
  Solution C: Sodium thiosulphate 0.2% (w/w).
  Preparing TTI System:
  TTI systems were prepared by printing Solution A using Flexo printer. TTI systems were printed on thin plastic white self adhesive labels. Iodine-starch (solution A) was first applied to the substrate. Then fructose (solution B) was applied to the substrate. The thickness of the composition B layer was 6, 12, 24 and 40 µm respectively. The systems were activated by spraying water-based Na thiosulfate (e.g. sodium thiosulfate) solution (solution C, either 0.2% by weight or 0.5% by weight) using paint brush.

Figure 4:
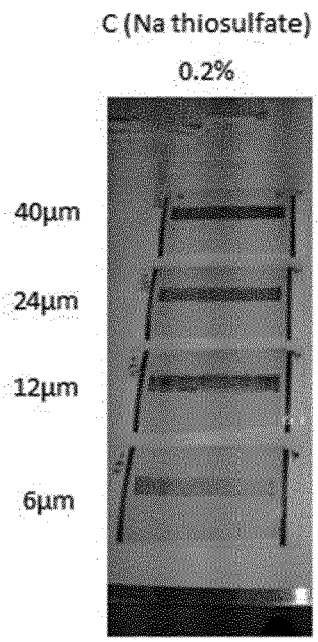
FIG. 4 illustrates the effects of the thickness of the one or more barrier component (see example 4).
Figure 5:
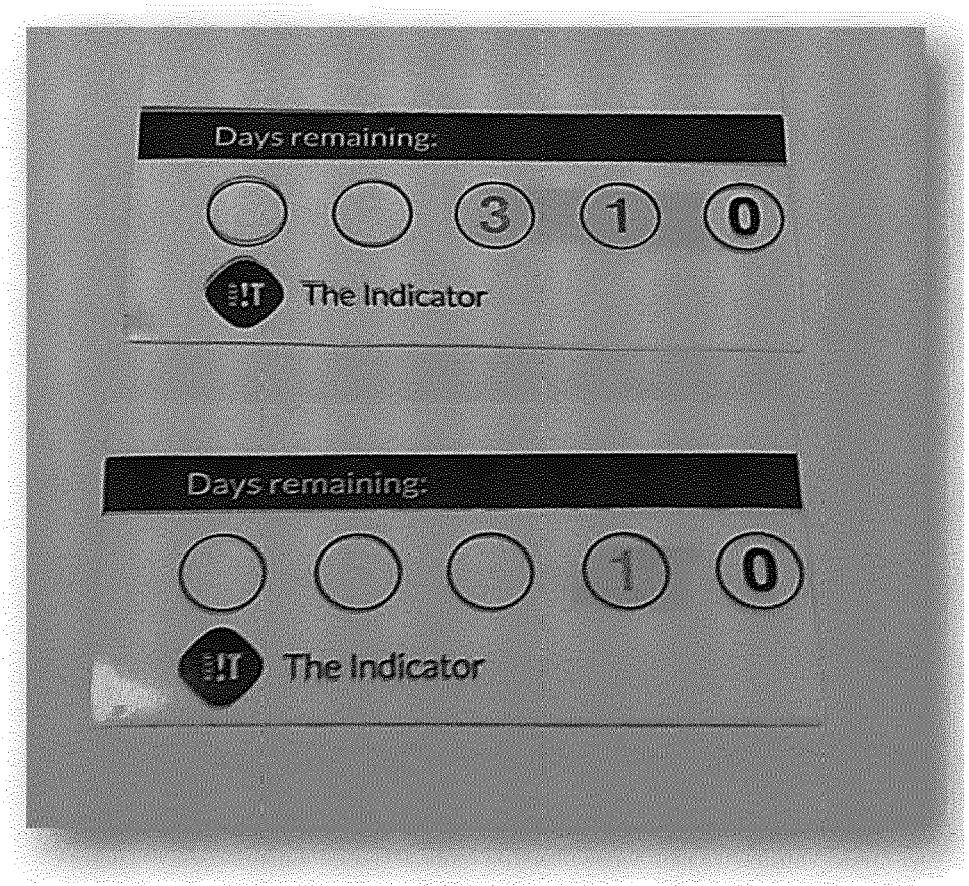
FIG. 5 illustrates an example of a visual representation of the TTI system according to the present invention. In this example, there are 5 circles with a number inside indicating the days remaining before the product should be discarded. The numbers will fade away at a rate depending on the time and temperature to which the TTI system has been exposed.

It was observed delay of color reduction with increasing thickness of composition B layer (FIG. 4).

Example 5

TTI System with One or More Barrier Component: Different Volumes of Solution A/Different Thickness of Layers of Solution B
  Chemicals:
  Solution A: 50 mM 12, 14.3% (w/w) starch.
  Solution B: Fructose 85% (w/w) in water (one or more barrier component).
  Solution C: Sodium thiosulphate 0.5% (w/w).
  Temperature: Room Temperature (RT), 12 C.

Preparing TTI System:

TTI systems were prepared by printing Solution A in four different volumes using Flexo printer. TTI systems were printed on thin plastic white self-adhesive labels. Iodine-starch (solution A) was first applied to the substrate. Then fructose (solution B) was applied to the substrate. The thickness of the composition B layer was 24, 60 and 100 μm respectively. The systems were activated by coating water-glycerol based Na thiosulfate (e.g. sodium thiosulfate) solution (solution C, 0.5% by weight). The solution was applied on the top of sugar layer with the 6 μm bar.

Figure 7A:
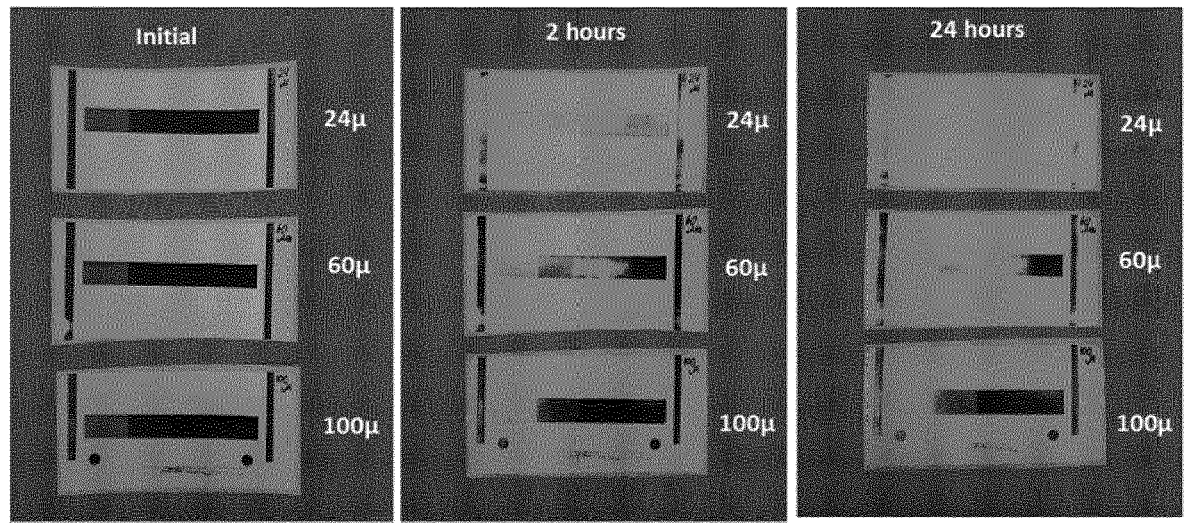
FIGS. 7a and 7b illustrate the effects of the thickness of the one or more barrier components at room temperature (FIG. 7a) and at 12° C.
Figure 7B:
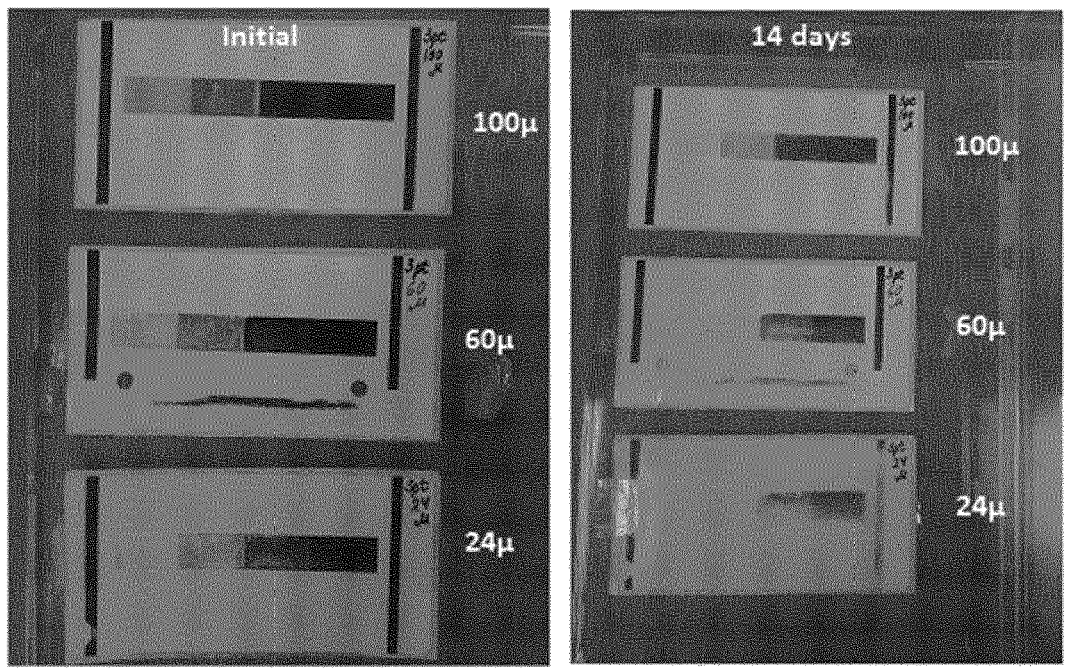

It was observed delay of color reduction with increasing thickness of composition B layer (FIG. 7a,7b) and decreasing color reduction with higher volumes of solution A.

The invention claimed is:

1. A time-temperature indicator (TTI) system comprising:
a substrate to which at least a first agent and a second agent have been applied, the substrate having at least a first and a second section, wherein:
the first agent and the second agent have been applied to at least the first and the second section of the substrate,
the first agent and the second agent provides a visual change in appearance when brought in contact in the presence of an activation fluid, and
the number of moles of the first agent that has been applied to the first section of the substrate is different from the number of moles of the first agent that has been applied to the second section of the substrate, or
the number of moles of the second agent that has been applied to the first section of the substrate is different from the number of moles of the second agent that has been applied to the second section of the substrate.

2. A time-temperature indicator (TTI) system comprising:
a substrate to which at least a first agent, a second agent and at least one barrier component have been applied, the substrate having at least a first and a second section, wherein:
the first agent, the second agent and the at least one barrier component have been applied to at least the first and the second section of the substrate,
the first agent and the second agent initially being separated by the at least one barrier component in the sections of the substrate to which the first agent, the second agent and the at least one barrier component have been applied,
the first agent and the second agent provide a visual change in appearance when brought in contact in the presence of an activation fluid, and
the number of moles of the first agent that has been applied to the first section of the substrate is different from the number of moles of the first agent that has been applied to the second section of the substrate, or
the number of moles of the second agent that has been applied to the first section of the substrate is different from the number of moles of the second agent that has been applied to the second section of the substrate, or
the number of moles of one of the barrier components that has been applied to the first section of the substrate is different from the number of moles of the same barrier component that has been applied to the second section of the substrate.

3. The time-temperature indicator (TTI) system according to claim 2, wherein the at least one barrier component is selected from the group consisting of wax, oil, fatty acid, sugar, sugar alcohol, salt and any mixture thereof.

4. The time-temperature indicator (TTI) system according to claim 2, wherein the at least one barrier component is not dissolved in a dissolution medium during application, or the at least one barrier component is dissolved in a dissolution medium during application, the dissolution medium being removed by suitable means after application.

5. The time-temperature indicator (TTI) system according to claim 2, wherein the at least one barrier component is applied to the substrate by at least one of printing, inkjet, offset, flexo, silkscreen, gravure, folio, spray printing, and coating.

6. The time-temperature indicator (TTI) system according to claim 2, wherein the number of moles of one of the barrier components that has been applied to the first section of the substrate is at least 10% higher than the number of moles of the same barrier component that has been applied to the second section of the substrate.

7. The time-temperature indicator (TTI) system according to claim 2, wherein the first agent:one of the barrier components:the second agent molar ratio of the first section of the substrate is different from the molar ratio of the same compounds of the second section of the substrate.

8. The time-temperature indicator (TTI) system according to claim 2, wherein:
the first agent:second agent molar ratio of the first section of the substrate is different from the first agent:second agent molar ratio of the second section of the substrate, and
the number of moles of one of the barrier component that has been applied to the first section is identical to the number of moles of the same barrier component that has been applied to the second section of the substrate.

9. The time-temperature indicator (TTI) system according to claim 2, wherein:
the first agent:second agent molar ratio of the first section of the substrate is identical to the first agent:second agent molar ratio of the second section of the substrate, and
the number of moles of one of the barrier components that has been applied to the first section of the substrate is different from the number of moles of the same barrier component that has been applied to the second section of the substrate.

10. The time-temperature indicator (TTI) system according to claim 1, wherein the substrate is selected from the group consisting of paper, coated paper, plastics, cardboard, metal, silicon, ceramics, fabrics, textiles, glass or any combination thereof.

11. The time-temperature indicator (TTI) system according to claim 1, wherein:
the first agent is a reducing agent and the second agent is an agent which changes visual appearance upon reduction,
the first agent is an oxidizing agent, and the second agent is an agent which changes visual appearance upon oxidation,
the first agent is a salt, and the second agent is an agent which changes visual appearance when forming a complex with the salt,
the first agent is a salt, and the second agent is an agent which changes visual appearance when forming a precipitate with the salt, or
the first agent is an acid, base or any mixture thereof, and the second agent is an agent which changes visual appearance upon a change in pH.

12. The time-temperature indicator (TTI) system according to claim 1, wherein the time-temperature indicator (TTI) system is being activated by applying an activation fluid to at least the first and the second section of the substrate.

13. The time-temperature indicator (TTI) system according to claim 12, wherein the activation fluid is applied by means of roller deposition, spraying, a mist chamber, injection or a coating unit.

14. The time-temperature indicator (TTI) system according to claim 1, wherein the activation fluid comprises water, glycerol or any combination thereof.

15. The time-temperature indicator (TTI) system according to claim 1, wherein the activation fluid comprises a pH modifying agent.

16. The time-temperature indicator (TTI) system according to claim 1, wherein:
   the first agent and the second agent are not dissolved in a dissolution medium during application, or
   the first agent and the second agent are dissolved in a dissolution medium during application, the dissolution medium being removed by suitable means after application, or
   one of said first and second agent is dissolved in a dissolution medium during application, the dissolution medium being removed by suitable means after application, and the other agent is not dissolved in a dissolution medium during application.

17. The time-temperature indicator (TTI) system according to claim 1, wherein the first agent and the second agent are dissolved in a mixture of water and glycerol during application, with the proviso that the amount of water is less than 40% by weight of the mixture.

18. The time-temperature indicator (TTI) system according to claim 1, wherein:
   the number of moles of the first agent that has been applied to the first section of the substrate is at least 10% higher than the number of moles of the first agent that has been applied to the second section of the substrate, or
   the number of moles of the second agent that has been applied to the first section of the substrate is at least 10% higher than the number of moles of the second agent that has been applied to the second section of the substrate.

19. The time-temperature indicator (TTI) system according to claim 1, wherein the first agent:second agent molar ratio of the first section of the substrate is different from the first agent:second agent molar ratio of the second section of the substrate.

20. The time-temperature indicator (TTI) system according to claim 1, wherein:
   the substrate is selected from the group consisting of paper, coated paper, plastics, cardboard, metal, silicon, ceramics, fabrics, textiles, glass or any combination thereof,
   the first agent and the second agent are dissolved in a dissolution medium during application, the dissolution medium being removed by suitable means after application thereby providing a time-temperature indicator (TTI) system in inactive state, and
   the time-temperature indicator (TTI) system is being activated by applying an activation fluid to at least the first and the second section of the substrate.

21. The time-temperature indicator (TTI) system according to claim 20, wherein the first agent is a reducing agent and the second agent is an agent which changes visual appearance upon reduction.

22. The time-temperature indicator (TTI) system according to claim 20, wherein the first agent is a mutarotational reducing agent the second agent is an agent which changes visual appearance upon reduction.

23. The time-temperature indicator (TTI) system according to claim 1, wherein the time-temperature indicator (TTI) system is in an inactive state.

24. The time-temperature indicator (TTI) system according to claim 1, wherein the first agent and the second agent are in contact in the absence of an activation fluid.

25. The time-temperature indicator (TTI) system according to claim 1, wherein the time-temperature indicator (TTI) system is dried.

26. The time-temperature indicator (TTI) system according to claim 1, wherein the time-temperature indicator (TTI) system is dried and therefore in its inactive state, the time-temperature indicator (TTI) system being activated by applying an activation fluid to at least the first and the second section of the substrate.

27. The time-temperature indicator (TTI) system according to claim 1, wherein the first agent and the second agent are in contact in the absence of an activation fluid, the time-temperature indicator (TTI) system being activated by applying an activation fluid to at least the first and the second section of the substrate.

28. The time-temperature indicator (TTI) system according to claim 1, wherein the activation fluid is a polar activation fluid.

29. The time-temperature indicator (TTI) system according to claim 28, wherein the polar activation fluid is a polar protic activation fluid.

* * * * *